US011996525B2

(12) United States Patent
Vincent et al.

(10) Patent No.: US 11,996,525 B2
(45) Date of Patent: May 28, 2024

(54) DEVICE FOR TRIGGERING THERMAL RUNAWAY OF AN ELECTROCHEMICAL ACCUMULATOR, NOTABLY OF A METAL-ION ACCUMULATOR AND ASSOCIATED METHOD

(71) Applicant: COMMISSARIAT A L'ENERGIE ATOMIQUE ET AUX ENERGIES ALTERNATIVES, Paris (FR)

(72) Inventors: Rémi Vincent, Grenoble (FR); Maxime Hubert, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 175 days.

(21) Appl. No.: 17/137,935

(22) Filed: Dec. 30, 2020

(65) Prior Publication Data
US 2021/0210798 A1   Jul. 8, 2021

(30) Foreign Application Priority Data
Jan. 3, 2020   (FR) ..................................... 20 00020

(51) Int. Cl.
*H01M 10/6571* (2014.01)
*G01N 25/72* (2006.01)
(Continued)

(52) U.S. Cl.
CPC ........ *H01M 10/4285* (2013.01); *G01N 25/72* (2013.01); *H01M 10/0525* (2013.01);
(Continued)

(58) Field of Classification Search
CPC .......... H01M 10/4285; H01M 10/615; H01M 10/6571
See application file for complete search history.

(56) References Cited

U.S. PATENT DOCUMENTS 7,335,448 B2    2/2008   Kaito et al.
7,338,733 B2    3/2008   Morita et al.
(Continued)

FOREIGN PATENT DOCUMENTS

WO    WO 2018/132911 A1    7/2018

OTHER PUBLICATIONS

Xuning Feng, et al., "Key Characteristics for Thermal Runaway of Li-ion Batteries", Energy Procedia, vol. 158, (2019), pp. 4684-4689.
(Continued)

*Primary Examiner* — James Lee
(74) *Attorney, Agent, or Firm* — Oblon, McClelland, Maier & Neustadt, L.L.P.

(57) ABSTRACT

A device triggers thermal runaway of an electrochemical accumulator, including a flexible package that contains at least once electrochemical cell. A part of the current collectors that form the output terminals of the accumulator pass through the flexible package. The device includes two electrical current conducting elements, each respectively in electrical contact with the exterior of a part of a metal layer of the flexible package or of the metal housing, and an electrical power supply independent from the accumulator. The electrical power supply is designed to drive a current, referred to as a heating current, between the two elements so as to heat up the flexible package or the housing of the accumulator by Joule effect.

13 Claims, 5 Drawing Sheets

(51) Int. Cl.
| | |
|---|---|
| *H01M 10/0525* | (2010.01) |
| *H01M 10/42* | (2006.01) |
| *H01M 10/615* | (2014.01) |
| *H01M 50/202* | (2021.01) |
| *H01M 50/224* | (2021.01) |
| *H01M 50/238* | (2021.01) |
| *H01M 50/543* | (2021.01) |

(52) U.S. Cl.
CPC ..... *H01M 10/615* (2015.04); *H01M 10/6571* (2015.04); *H01M 50/202* (2021.01); *H01M 50/224* (2021.01); *H01M 50/238* (2021.01); *H01M 50/543* (2021.01)

(56) References Cited

U.S. PATENT DOCUMENTS

| | | | |
|---|---|---|---|
| 7,348,098 | B2 | 3/2008 | Hayashi et al. |
| 2006/0121348 | A1 | 6/2006 | Mizutani et al. |
| 2008/0057392 | A1 | 3/2008 | Takamatsu et al. |
| 2008/0060189 | A1 | 3/2008 | Daidoji et al. |
| 2014/0004393 | A1* | 1/2014 | Takahashi .................. H02J 7/35 |
| | | | 429/62 |
| 2017/0059500 | A1 | 3/2017 | Honda et al. |
| 2019/0386262 | A1 | 12/2019 | Mo et al. |
| 2020/0036068 | A1 | 1/2020 | Recoskie et al. |

OTHER PUBLICATIONS

Xuning Feng, et al., "Thermal runaway mechanism of lithium ion battery for electric vehicles: A review", Energy Storage Materials, vol. 10, (2018), pp. 246-267.
Https://web.archive.org/web/20181014045444/http://www.mixtl.com/AluminumLaminatedFilm400mmWx7.5mL-EO-aif-400-7.5M.aspx, (2018), 2 pages.
French Preliminary Search dated Sep. 3, 2020 in French Application 20 00020 filed on Jan. 3, 2020 (with English Translation of Categories of Cited Documents), 3 pages.

* cited by examiner

[Fig 1]

(PRIOR ART)

[Fig 2]

(PRIOR ART)

[Fig 3]

(PRIOR ART)

[Fig 4]

(PRIOR ART)

[Fig 5]

(PRIOR ART)

DEVICE FOR TRIGGERING THERMAL RUNAWAY OF AN ELECTROCHEMICAL ACCUMULATOR, NOTABLY OF A METAL-ION ACCUMULATOR AND ASSOCIATED METHOD

TECHNICAL FIELD

The present invention relates to the field of electrochemical accumulators and, more particularly, metal-ion accumulators.

More particularly, the invention relates to the evaluation of the safety of batteries.

The invention is mainly aimed at forcing a metal-ion accumulator to go into thermal runaway in order to study the safety devices or else the risks of propagation within a battery pack.

Although described with reference to a Lithium-ion accumulator, the invention is applicable to any metal-ion electrochemical accumulator, in other words also sodium-ion, magnesium-ion, aluminium-ion accumulators . . . or, more generally, to any electrochemical accumulator.

A battery pack according to the invention may be an onboard or stationary system. For example, the fields of electric and hybrid transport and of storage systems connected to the network may be envisaged in the framework of the invention.

PRIOR ART

Figure 1:
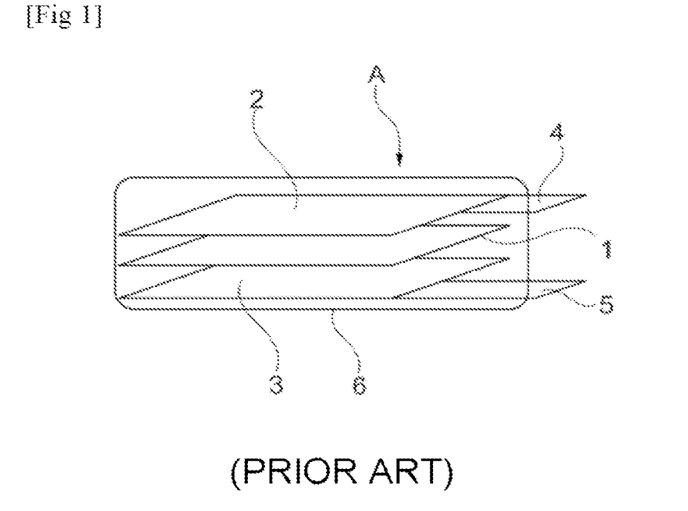
FIG. 1 is an exploded schematic perspective view showing the various elements of a lithium-ion accumulator.
Figure 2:
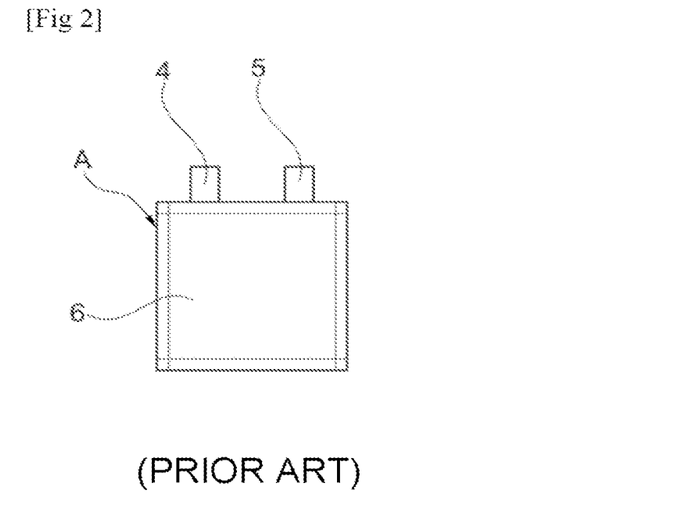
FIG. 2 is a front view showing a lithium-ion accumulator with its flexible package according to the prior art.

As illustrated schematically in FIGS. 1 and 2, a lithium-ion battery or accumulator usually comprises at least one electrochemical cell composed of an electrolyte constituent 1 between a positive electrode or cathode 2 and a negative electrode or anode 3, a current collector 4 connected to the cathode 2, a current collector 5 connected to the anode 3 and lastly, a package 6 configured to contain the electrochemical cell in a tightly sealed manner while allowing a part of the current collectors 4, 5 to pass through.

The conventional architecture of lithium-ion batteries comprises an anode, a cathode and an electrolyte. Several types of geometry of conventional architecture are known:
- a cylindrical geometry such as disclosed in the Patent application US 2006/0121348,
- a prismatic geometry such as disclosed in the U.S. Pat. Nos. 7,348,098, 7,338,733;
- a stacked geometry such as disclosed in the Patent applications US 2008/060189, US 2008/0057392, and U.S. Pat. No. 7,335,448.

The electrolyte constituent 1 may be in the form of a solid, liquid or gel. In the form of a gel or liquid, the constituent may comprise a separator made of polymer, ceramic or of microporous composite imbibed with organic electrolyte(s) of the ionic liquid type which allows the displacement of the Lithium ion from the cathode to the anode for a charge and vice versa for a discharge, which generates the current. The electrolyte is, in general, a mixture of organic solvents, for example carbonates into which a lithium salt, typically LiPF6, is added.

The positive electrode or cathode 2 is composed of materials for insertion of the Lithium cation which are in general a composite, such as $LiFePO_4$, $LiCoO_2$, $LiNi_{0.33}Mn_{0.33}Co_{0.33}O_2$. The negative electrode or anode 3 is very often composed of graphitic carbon or of $Li_4TiO_5O_{12}$ (titanate material), potentially also comprising silicon, or of composite formed using silicon.

The current collector 4 connected to the positive electrode is generally made of aluminium. The current collector 5 connected to the negative electrode is generally made of copper, of a copper-nickel alloy or of aluminium.

A lithium-ion battery or accumulator may of course comprise a plurality of electrochemical cells which are stacked on top of one another.

Traditionally, a Li-ion battery or accumulator uses a pair of materials at the anode and at the cathode allowing it to operate at a high level of voltage, typically equal to 3.6 Volts.

Depending on the type of application targeted, it is sought to produce either a thin and flexible lithium-ion accumulator or a rigid accumulator: the package is thus either flexible or rigid and constitutes, in this latter case, a kind of housing.

The flexible packages are usually fabricated from a multilayer composite material, composed of a stack of layers of aluminium covered by one or more film(s) of polymer laminated by bonding.

The rigid packages are, on the other hand, used when the targeted applications are restrictive or a long lifetime is sought, with for example much higher pressures to be withstood and a stricter level of sealing required, typically less than $10^{-8}$ mbar·l/s, or in environments with severe constraints such as the aerospace field.

Also, heretofore, a rigid package used is composed of a metal housing, typically made of stainless steel (316L or 304) or of aluminium (Al 1050 or Al 3003), or potentially of titanium.

The geometry of the majority of the rigid housings for Li-ion accumulator packages is cylindrical, since the majority of the electrochemical cells of the accumulators are rolled up by winding according to a cylindrical geometry around a cylindrical mandrill. Prismatic housing shapes have also already been formed by winding around a prismatic mandrill.

Figure 3:
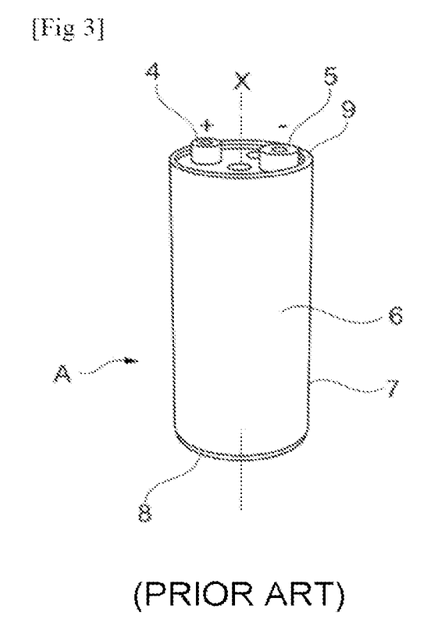
FIG. 3 is a perspective view of a lithium-ion accumulator according to the prior art with its rigid package consisting of a housing of cylindrical shape.

One of the types of rigid housing of cylindrical shape, usually fabricated for a high-capacity Li-ion accumulator, is illustrated in FIG. 3.

Figure 4:
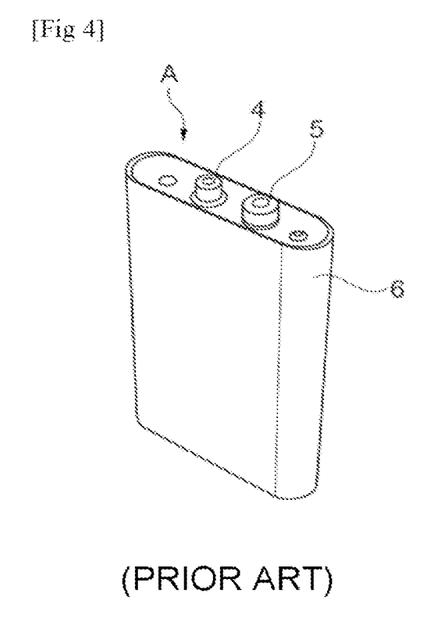
FIG. 4 is a perspective view of a lithium-ion accumulator according to the prior art with its rigid package consisting of a housing of prismatic shape.

A rigid housing of prismatic shape is also shown in FIG. 4.

The housing 6 comprises a cylindrical lateral envelope 7, a base 8 at one end, a cover 9 at the other end, the base 8 and the cover 9 being assembled to the envelope 7. The cover 9 carries the poles or terminals for output of the current 4, 5. One of the output terminals (poles), for example the negative terminal 5 is welded onto the cover 9, whereas the other output terminal, for example the positive terminal 4, passes through the cover 9 with interposition of a seal, not shown, which electrically insulates the positive terminal 4 from the cover.

The type of rigid housing widely fabricated also consists of a bucket and a cover, welded together around their periphery. On the other hand, the current collectors comprise a bushing with a protruding part on the top of the housing and which forms a terminal also called a pole protruding from the battery.

A battery pack P is composed of a variable number of accumulators able to reach several thousand which are electrically connected together in series or in parallel and generally by connection bars, usually called busbars.

Figure 5:
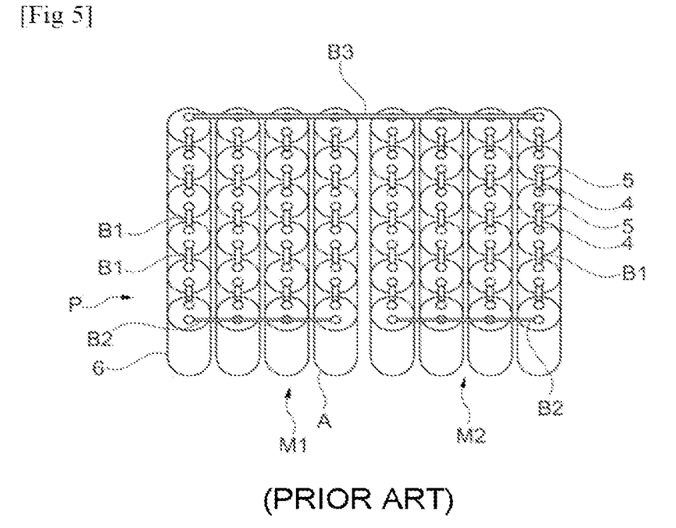
FIG. 5 is a perspective view of an assembly by means of busbars of lithium-ion accumulators according to the prior art, forming a battery pack.

One example of a battery pack P is shown in FIG. 5. This pack is composed of two identical modules M1, M2 of Li-ion accumulators A connected together in series, each module M1, M2 being composed of four rows of accumulators connected in parallel, each row being composed of a number equal to six of Li-ion accumulators in series.

As shown, the mechanical and electrical connection between two Li-ion accumulators of the same row is implemented by screwing the busbars B1, advantageously made of copper, each connecting a positive terminal 4 to a negative terminal 5. The connection between two rows of accumulators in parallel within the same module M1 or M2 is provided by a busbar B2, also advantageously made of copper. The connection between the two modules M1, M2 is provided by a busbar B3, also advantageously made of copper.

In the development and the fabrication of lithium-ion batteries, for each profile/new application, for whichever target market, this requires precise dimensioning (series/parallel electrical, mechanical, thermal, architectures, etc.) in order to design a high-performance and safe battery pack in an optimal manner.

In particular, the safety of lithium-ion accumulators must be taken into consideration both at the scale of a single accumulator, of a module and of a battery pack.

Various passive or active devices having a safety function may also be integrated into a cell (accumulator), and/or a module and/or the battery pack in order to prevent problems, when the battery is under conditions of so-called abusive operation or in the case of a fault in a cell.

A lithium electrochemical system, whether this be at the scale of the cell (accumulator), of the module or of the pack, produces exothermic reactions irrespective of the given cycling profile. Thus, at the scale of a unitary accumulator, depending on the chemistries in question, the optimal operation of lithium ion accumulators is limited within a certain range of temperature.

An electrochemical accumulator must operate within a defined range of temperature, typically generally less than 70° C. on its housing outer surface, to avoid degrading its performance characteristics, or even degrading it physically to destruction.

For example, lithium accumulators using iron phosphate may be mentioned which have a range of operation generally in the range between −20° C. and +60° C. Beyond 60° C., the materials can undergo significant degradations reducing the performance of the cell. Beyond a 'thermal runaway' temperature, which may be in the range between 70° C. and 110° C., exothermic internal chemical reactions may be triggered. When the accumulator is no longer able to evacuate enough heat, the temperature of the cell increases up to destruction, this phenomenon usually being denoted by the term "thermal runaway".

In other words, a thermal runaway occurs in a cell (accumulator) when the energy released by the exothermic reactions, which take place inside of the latter, exceeds the capacity to dissipate it to the outside. This runaway may be followed by a generation of gas and by an explosion and/or fire.

Also, maintaining a temperature below 70° C. allows the lifetime of an accumulator to be increased, because the higher the operating temperature of an accumulator, the more its lifetime will be reduced.

Furthermore, certain accumulator chemistries require an operating temperature well above ambient temperature and, as a consequence, it turns out to be necessary to regulate their temperature level by an initial pre-heating of the accumulators, or even by permanently maintaining the accumulators at temperature.

In a cell (accumulator), the various known internal protection devices are:
  a positive temperature coefficient (or PTC acronym for "Polymeric positive Temperature Coefficient") device: currently, a large number of cylindrical accumulators already on the market are fitted with these. Such a device takes the form of a ring made of polymer (polyethylene) laminated with a metal. In the case of an overload, this polymer heats up, changes phase, becomes more resistive and thus limits the passage of the current;
  a current interruption device (CID): this interrupts the current if the pressure of the gas in the cell exceeds the specified limits;
  a shutdown device which prevents the generation of high currents;
  a vent composed of a valve or of a rupture disc, which opens when the internal pressure abruptly increases, and exceeds a given critical pressure, in order to avoid the explosion of the cell;
  a thermal fuse, currently implemented in high-capacity accumulators, which interrupts the current whenever the temperature in the accumulator is too high.

Furthermore, the objective of the battery manufacturers is to continually increase the energy of their batteries in order to improve the performance characteristics. Thus, the use of materials with high energy capacity but with a highly exothermic behaviour in the case of thermal runaway of an accumulator is increasingly common: [1].

It is therefore important to study the phenomena leading to the thermal runaway of accumulators, together with the risks of propagation of this runaway to other accumulators in the case of a module or of a pack containing several accumulators.

In addition, when devices internal to the accumulators are studied, for safety and for the propagation of the thermal runaway, it is necessary to develop a fast and reproducible solution for triggering a thermal runaway.

Currently, in order to force a lithium-ion accumulator into a thermal runaway, several solutions exist and essentially consist either in causing an electrical overload, or in implementing an external short-circuit, or in applying a piercing or an external overheating of the accumulator.

A CID device protects very well the accumulator from an overload and from an external short-circuit.

In the case of a piercing which takes place by penetration of a nail, the problem is the leak of the gases via the hole created by the nail. This outgassing is not representative of the rise in pressure and of the ejection of the gases via the vents during a real thermal runaway. The piercing device is, moreover, difficult to implement on a cell situated in the middle of a pack.

Finally, the problem of the overheating of a lithium-ion accumulator with a system of the heating cartridge type is the time it takes to get to the thermal runaway and also the quantity of energy needed. This may notably affect neighbouring accumulators, in other words adjacent within a module or of a battery pack, in a non-negligible manner. For example, with a heating cartridge generating a power of 300 W, around 30 minutes are needed in order to initiate a thermal runaway, i.e. an energy consumed of 150 Wh. Moreover, in the case of a test of propagation within a module, it is necessary to adapt the structure of the latter in order to be able to introduce the heating cartridge.

Accordingly, there exists a need to improve the solutions for limited triggering of a thermal runaway of an electrochemical accumulator, notably of a metal-ion accumulator, in order to overcome the aforementioned drawbacks.

The aim of the invention is to, at least in part, meet this need.

DESCRIPTION OF THE INVENTION

For this purpose, the invention relates, under one of its aspects, to a device for triggering thermal runaway of at least one electrochemical accumulator comprising a flexible package at least one layer of which is metal, or a metal housing, configured for containing at least one electrochemical cell through which a part of the current collectors forming the output terminals of the accumulator pass, the device comprising:

two elements for conducting electrical current each respectively in electrical contact with the exterior of a part of the metal layer of the flexible package or of the metal housing, an electrical power supply independent from the accumulator, designed to drive a current, referred to as a heating current, between the two elements so as to heat up the flexible package or the housing of the accumulator by Joule effect (resistive heating).

As far as the phenomenon of thermal runaway is concerned, reference will be made to the publication [2] and to the protocol described in this publication. The temperatures referred to as "self-heating" and "thermal runaway" temperatures are respectively denoted T1 and T2 in this publication.

The temperature T1, typically 70° C., in FIG. 2 of the publication, is the temperature from which the accumulator heats up without a source at a typical rate of 0.02° C./min under adiabatic conditions.

The temperature T2, typically 150° C., in FIG. 2 of the publication, is the temperature from which the accumulator heats up at a rate of heating typically of 10° C./min under adiabatic conditions, which leads to the fusion of the separator in the electrochemical circuit group of the accumulator, to a short-circuit and hence to the collapse of the voltage. The term "thermal runaway" may thus here and in the framework of the invention be understood to mean a ratio between the value of the derivative of the heating temperature and that of time equal to at least 0.02° C. per min.

The two current conducting elements are advantageously conducting rings or foils.

According to one advantageous variant embodiment, the two current conducting elements are arranged around the lateral envelope of the metal housing or around the metal layer of the flexible package of the accumulator.

According to this variant, preferably, one of the two current conducting elements is arranged as close as possible to one of the longitudinal ends of the accumulator, whereas the other of the two elements is arranged as close as possible to the other of the longitudinal ends. This arrangement allows the surface area of the package (flexible or housing) of the accumulator through which the heating current will flow to be maximized. In one particular case, it is even possible to use a foil at the negative terminal of the accumulator as negative current conducting element of the device according to the invention.

According to one advantageous application, the flexible package consists of a stack of three layers whose middle layer is the metal layer exposed in part and in contact with the two elements, whereas the inner and outer layers are made of polymer.

More advantageously, the stack is a polyamide/aluminium/polypropylene tri-layer. This may be the tri-layer flexible package marketed by the company MTI corporation: https://www.mtxtl.com/AluminumLaminatedFilm400mmWx7.5mL-EQ-alf-400-7.5M.aspx.

According to one advantageous embodiment, the device is that for triggering thermal runaway of at least one accumulator from amongst a plurality of accumulators, the two electrical current conducting elements taking the form of foils each respectively in electrical contact with the exterior of a part of the metal layer of the flexible package or of the metal housing of each of the accumulators.

Each accumulator may be a Li-ion accumulator in which:
the negative electrode material is chosen within the group comprising graphite, lithium, lithium titanate oxide $Li_4TiO_5O_{12}$;
the positive electrode material is chosen within the group comprising $LiFePO_4$, $LiCoO_2$, $LiNi_{0.33}Mn_{0.33}C_{0.33}O_2$.

According to one advantageous variant, the triggering device is configured such that the flexible package or the metal housing is electrically connected to one of the output terminals of the accumulator, the said output terminal of the accumulator being arranged on the flexible package or on the metal housing outside of a region for the flow of an electrical current between the two electrical current conducting elements.

In other words, it is made sure that the output terminal electrically connected to the package or to the housing is arranged outside of the field of the heating electrical current which flows between the two electrical current conducting elements. This does not prevent this output terminal from being electrically connected to one of the current conducting elements, for example in the case where the output terminal and the electrical current conducting elements are connected to the same foil.

By virtue of this feature, the perturbations of potential on the electrochemical cell, able to be generated by the flow of a high heating current through the package or the housing, are limited.

The invention also relates to a method for triggering thermal runaway of at least one accumulator implemented by a device previously described, comprising the following step:

a/ application of a current flowing between the two current conducting elements so as to heat the flexible package or the housing of the accumulator by Joule effect.

According to one advantageous embodiment, the method comprises a step b/ for applying a charge or discharge current which flows through the accumulator between its output terminals; the step a/ being carried out during the step b/.

The step a/ may be carried out simultaneously with the start of the step b/ or offset in time with respect to the latter. Where appropriate, the step b/ may even be omitted, which corresponds to a situation where it is desired to cause the accumulator to runaway thermally outside of any charge or discharge condition. This situation may for example correspond to a simulation of a case of heating external to the accumulator.

Preferably, the potential of the metal housing or of the metal layer of the flexible package, during the step b/, is equal to 0V.

According to one advantageous feature, the current applied according to the step a/ is of the order of 200 A for an accumulator in the standard format 18650.

Thus, the invention essentially consists of a device for heating up the accumulator by Joule effect which will deliver a current of high value in the metal housing or in the metal layer of the flexible package which thus operates as an electrical resistive heater.

The metal housing, typically made of stainless steel or of aluminium, or a metal layer, typically of aluminium, allows a conduction of electricity while at the same time having a resistivity which is non-negligible.

Thus, by making a high current flow in the flexible or rigid package of an accumulator, the invention allows the very fast heating, typically in a time of less than 5 minutes, without generating too much heating of the surrounding accumulators within a module.

Other advantages and features of the invention will become more apparent upon reading the detailed description of exemplary embodiments of the invention, presented by way of non-limiting illustration and with reference to the following figures.

DETAILED DESCRIPTION

FIGS. 1 to 5 relate to different examples of Li-ion accumulator, of flexible package and of accumulator housing and also of a battery pack according to the prior art. These FIGS. 1 to 5 have already been commented on in the introduction and are not therefore discussed further herinafter.

For the sake of clarity, the same references denoting the same elements according to the prior art and according to the invention are used for all the FIGS. 1 to 9.

Figure 6:
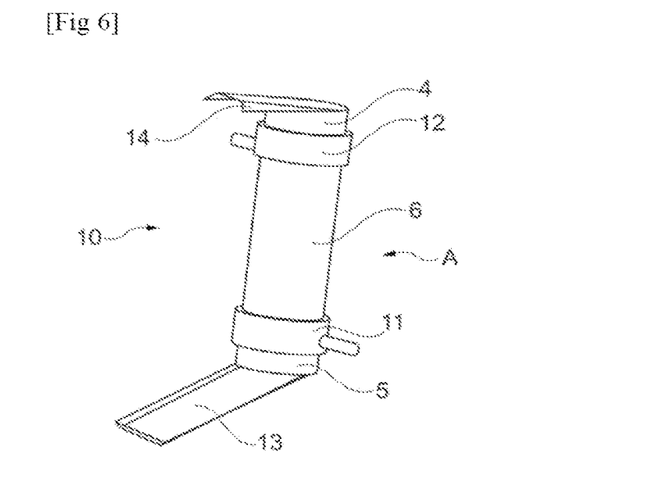
FIG. 6 is a photographic reproduction of a device for triggering a thermal runaway of a Li-ion accumulator of standard format 18650, according to the invention.
Figure 7:
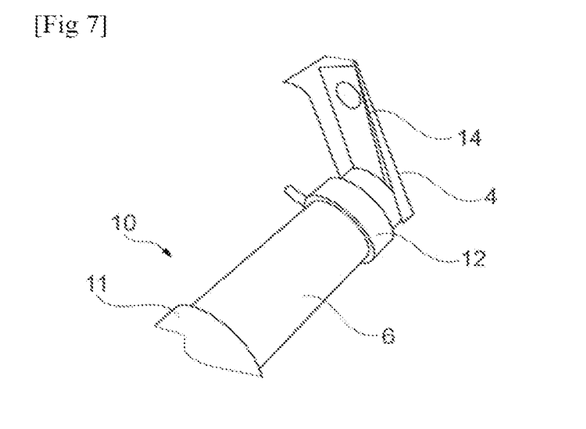
FIG. 7 is another photographic reproduction of the device according to FIG. 6.

FIGS. 6 and 7 show one example of a device 10 for triggering thermal runaway of a Li-ion accumulator A, according to the invention.

Figure 9:
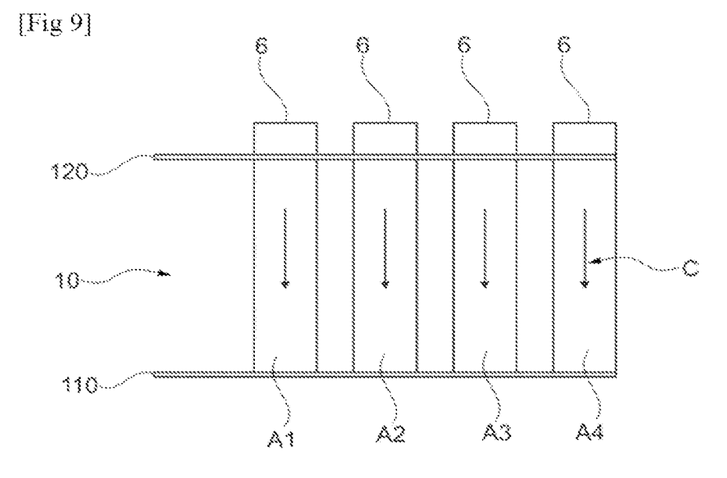
FIG. 9 is a schematic view of a device according to the invention implemented for several adjacent accumulators.

In the examples illustrated, the accumulators A, A1-A4 illustrated have housings with a cylindrical format, typically the format 18650, or a prismatic format.

The device 10 comprises two current conducting rings 11, 12 fixed by crimping around the metal bucket 6, typically made of stainless steel, of a Li-ion accumulator A. As shown, preferably, each of the two rings 11, 12 is fixed as close as possible to one of the longitudinal ends, here to one of the output terminals 4, 5 of the accumulator A. In particular, for the fixing at the end of the negative output terminal 5, this allows the problems of biasing the anode during the stress test to be avoided.

The two rings 11, 12 are connected to an electrical power supply (not shown) which allows a current of high value to be delivered.

At each end of the bucket 6, an electrically insulating film 13, 14, of the Kapton® type encapsulates the output terminal 4 or 5 in order to avoid any short-circuit when a current is applied through the rings.

The inventors have carried out tests in order to validate the operation of the device 10 according to the invention.

These tests consist in causing a high current to flow in the bucket 6 by means of conducting rings so as to make the accumulator heat up very rapidly, typically in a time of less than 5 minutes.

Figure 8:
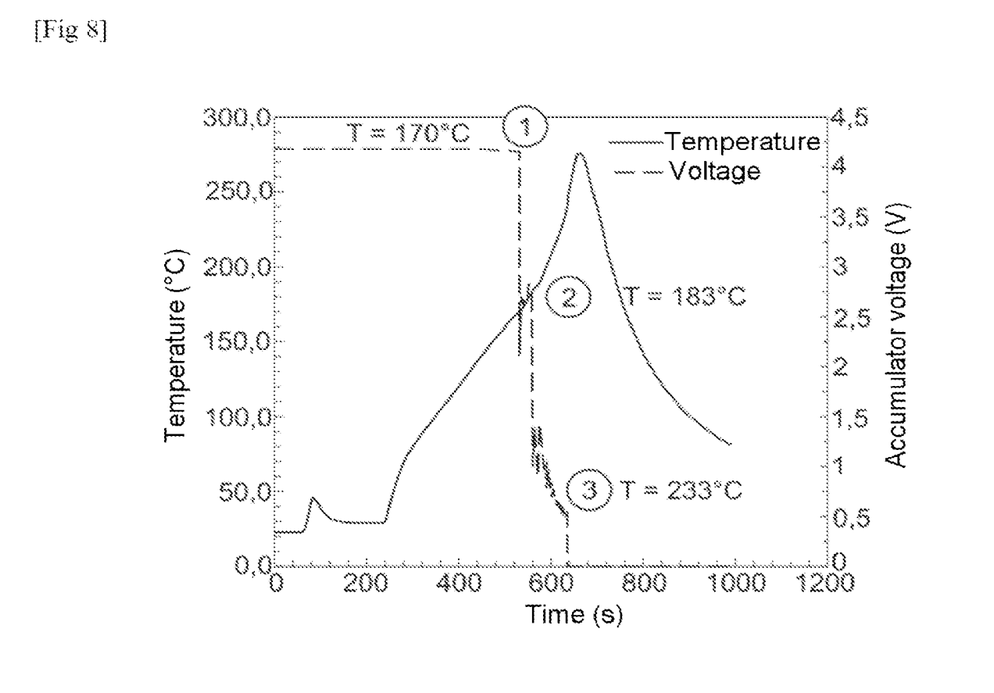
FIG. 8 is a view of curves respectively showing the time variation of the temperature and of the voltage during a thermal runaway test implemented with a device according to the invention.

FIG. 8 shows the curves of variation over time of temperature and of voltage, respectively, of the accumulator during a thermal runaway test implemented with the invention. For this test, a current of 200 A has been applied to the bucket 6 with a voltage across the terminals 4, 5 of the accumulator equal to 0.7V.

The current of 200 A is applied starting from t=250 s. It is noted that, starting from this time, less than 5 minutes (t<550 s) is needed in order to initiate the thermal runaway of the accumulator A and to go from 30° C. to 170° C. This represents an energy of 12 Wh to generate the thermal runaway, i.e. more than 10 times less than the energy needed with a heating cartridge according to the prior art.

In addition, the installation of the device according to the invention 10 has the advantage of being simpler to introduce in a module with several adjacent accumulators.

FIG. 9 shows one advantageous embodiment, according to which the rings 11, 12 are replaced by foils 110, 120 one of which 110, which connects the buckets 6 of a set of accumulators A1 to A4 at the bottom and the heating current C, then flows from this foil 110 to the foil 120 connecting the negative poles 4 of the accumulators A1 to A4.

The invention is not limited to the examples that have just been described; features of the examples illustrated may notably be combined together within variants not illustrated.

Other variants and improvements may be envisaged without however straying from the framework of the invention.

Although, in the examples illustrated in FIGS. 6 and 7, the current conducting elements for heating up the accumulator are formed by conducting rings fixed around the metal housing, any other type of element may be envisaged, such as the foils shown schematically in FIG. 9.

Although the examples illustrated relate to accumulators with a housing, the invention is applicable to the triggering of thermal runaway of accumulators with a flexible package comprising at least one metal layer in contact with which the two current conducting heating elements are placed. The metal layer then acts as a resistive heater.

LIST OF THE CITED REFERENCES

[1] Xuning Feng, et al. "*Thermal runaway mechanism of lithium ion battery for electric vehicles: A review*" Energy Storage Materials, Volume 10, January 2018, Pages 246-267.

[2] Xuning Feng, et al. "*Key Characteristics for Thermal Runaway of Li-ion Batterys*" Energy Procedia, 158 (2019) 4684-4689.

The invention claimed is:

1. An apparatus comprising at least one electrochemical accumulator and a device for triggering thermal runaway of the at least one electrochemical accumulator, the at least one electrochemical accumulator comprising current collectors and a flexible package at least one layer of which is metal or a metal housing, configured for containing at least one electrochemical cell and, at the same time, through which a part of the current collectors forming output terminals of the at least one electrochemical accumulator pass, the device comprising:
   two electrical current conducting elements each respectively in electrical contact with the exterior of a part of the metal layer of the flexible package or of the metal housing,
   an electrical power supply independent from the at least one electrochemical accumulator, designed to drive a current, referred to as a heating current, between the two electrical current conducting elements so as to heat up the flexible package or the housing of the at least one electrochemical accumulator by Joule effect, the flexible package or the housing operating as an electrical resistive heater.

2. The apparatus according to claim 1, wherein the two electrical current conducting elements are conducting rings or foils.

3. The apparatus according to claim 1, wherein the two electrical current conducting elements are arranged around a lateral envelope of the metal housing or around the metal layer of the flexible package of the at least one electrochemical accumulator.

4. The apparatus according to claim 1, wherein one of the two electrical current conducting elements are arranged as close as possible to one of longitudinal ends of the at least one electrochemical accumulator, whereas the other of the two electrical current conducting elements is arranged as close as possible to another of the longitudinal ends.

5. The apparatus according to claim 1, wherein the flexible package is composed of a stack of three layers whose middle layer is the metal layer exposed in part and in contact with the two electrical current conducting elements, whereas an inner layer and an outer layer are made of polymer.

6. The apparatus according to claim 5, wherein the stack is a polyamide/aluminium/polypropylene tri-layer.

7. The apparatus according to claim 1, comprising a plurality of electrochemical accumulators and for at least one electrochemical accumulator from amongst the plurality of electrochemical accumulators, the two electrical current conducting elements take a form of foils each respectively in electrical contact with an exterior of a part of the metal layer of the flexible package or of the metal housing of each of the plurality of electrochemical accumulators.

8. The apparatus according to claim 1, wherein each of the at least one electrochemical accumulator is a Li-ion accumulator in which:
   a negative electrode material is chosen within the group comprising graphite, lithium titanate oxide $Li_4TiO_5O_{12}$;
   a positive electrode material is chosen within the group comprising $LiFePO_4$, $LiCoO_2$, $LiNi_{0.33}Mn_{0.33}Co_{0.33}O_2$.

9. The apparatus according to claim 1, wherein the device is configured such that the flexible package or the metal housing is electrically connected to one of the output terminals of the at least one electrochemical accumulator, which is arranged on the flexible package or on the metal housing outside of a region for a flow of an electrical current between the two electrical current conducting elements.

10. A method for triggering thermal runaway of the at least one accumulator implemented by the device of the apparatus according to claim 1, the method comprising:
    applying a current flowing between the two electrical current conductive elements so as to heat up the flexible package or the housing of the accumulator by Joule effect.

11. The method according to claim 10, comprising applying, during application of the current, a charge or discharge current which flows through the accumulator between its output terminals.

12. The method according to claim 11, wherein the potential of the metal housing or of the metal layer of the flexible package, during application of the charge, is equal to 0V.

13. The method according to claim 10, wherein, the current applied is of the order of 200 A for an accumulator of standard format 18650.

* * * * *